(12) United States Patent
Berg et al.

(10) Patent No.: US 11,717,985 B2
(45) Date of Patent: Aug. 8, 2023

(54) NOZZLE UNIT FOR A REACTION MOULDING MACHINE AND METHOD FOR PRODUCING A PLASTIC PART

(71) Applicant: KRAUSSMAFFEI TECHNOLOGIES GMBH, Munich (DE)

(72) Inventors: Alexander Berg, Dachau (DE); Thomas Nowak, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 753 days.

(21) Appl. No.: 16/490,651

(22) PCT Filed: Mar. 1, 2018

(86) PCT No.: PCT/EP2018/055027
§ 371 (c)(1),
(2) Date: Sep. 3, 2019

(87) PCT Pub. No.: WO2018/172035
PCT Pub. Date: Sep. 27, 2018

(65) Prior Publication Data
US 2020/0001501 A1    Jan. 2, 2020

(30) Foreign Application Priority Data
Mar. 21, 2017   (DE) ............. 10 2017 106 038.3

(51) Int. Cl.
*B29B 7/76*    (2006.01)
*B05B 1/16*    (2006.01)
(Continued)

(52) U.S. Cl.
CPC .......... *B29B 7/7652* (2013.01); *B29B 7/7663* (2013.01)

(58) Field of Classification Search
None
See application file for complete search history.

(56) References Cited

U.S. PATENT DOCUMENTS

| | | | | |
|---|---|---|---|---|
| 4,003,501 A | * | 1/1977 | Ramazzotti | B29B 7/7689 222/145.5 |
| 4,165,187 A | * | 8/1979 | James | B29C 31/042 366/159.1 |

(Continued)

FOREIGN PATENT DOCUMENTS

| | | |
|---|---|---|
| CN | 104128129 A | 11/2014 |
| CN | 104470693 A | 3/2015 |

(Continued)

OTHER PUBLICATIONS

DE-102011002880-A1 (Wilhelm) Jul. 2012 (online machine translation), [Retrieved on Aug. 6, 2022], Retrieved from: Espacenet (Year: 2012).*

(Continued)

*Primary Examiner* — Alison L Hindenlang
*Assistant Examiner* — Andrés E. Behrens, Jr.
(74) *Attorney, Agent, or Firm* — Pearne & Gordon LLP

(57) ABSTRACT

A nozzle unit for a reaction molding machine, comprising an inlet channel prepared for connection to a mixing head outlet and comprising a first dispensing nozzle, which is prepared for applying a reactive mixture and which is connected to the inlet channel in a first operating state, a second dispensing nozzle being present, which is connected to the inlet channel in a second operating state and which is likewise prepared for applying a reactive mixture. Further disclosed is a mixing head device for a reaction molding machine having the nozzle unit, to a reaction molding machine having the mixing head device, and to a method for producing a plastic part.

11 Claims, 1 Drawing Sheet

(51) Int. Cl.
    *B05B 1/12*     (2006.01)
    *B05B 1/00*     (2006.01)
    *B29B 7/00*     (2006.01)

(56) References Cited

U.S. PATENT DOCUMENTS

| | | | |
|---|---|---|---|
| 4,189,070 A * | 2/1980 | Macosko | B29B 7/7663 |
| | | | 222/134 |
| 5,587,182 A | 12/1996 | Sulzbach et al. | |
| 2015/0064356 A1 * | 3/2015 | Scheidt | B05B 15/68 |
| | | | 901/43 |

FOREIGN PATENT DOCUMENTS

| | | | |
|---|---|---|---|
| DE | 1213314 | 3/1966 | |
| DE | 2536883 | 3/1976 | |
| DE | 3435769 A1 | 4/1985 | |
| DE | 10 2004 059 218 A1 | 6/2006 | |
| DE | 102011002880 A1 | 7/2012 | |
| DE | 102011002880 A1 * | 7/2012 | ............ B05C 1/027 |
| DE | 102012006048 A1 | 10/2013 | |
| DE | 102016111439 A1 | 12/2017 | |
| EP | 0437727 A3 | 7/1991 | |
| EP | 0669196 A1 | 8/1995 | |
| EP | 1020272 A2 | 7/2000 | |
| EP | 1270086 A1 | 1/2003 | |
| EP | 2050797 A1 | 4/2009 | |
| EP | 2050797 A1 * | 4/2009 | ........... B29B 7/7615 |
| GB | 863712 | 3/1961 | |
| WO | WO-2020220215 A1 * | 11/2020 | |

OTHER PUBLICATIONS

WO-2020220215-A1 (Huang) Jan. 2020 (online machine translation), [Retrieved on Oct. 27, 2022], Retrieved from: Espacenet (Year: 2020).*

International Search Report for PCT/EP2018/055027 dated Apr. 20, 2018.

Written Opinion for PCT/EP2018/055027 dated Apr. 20, 2018.

* cited by examiner

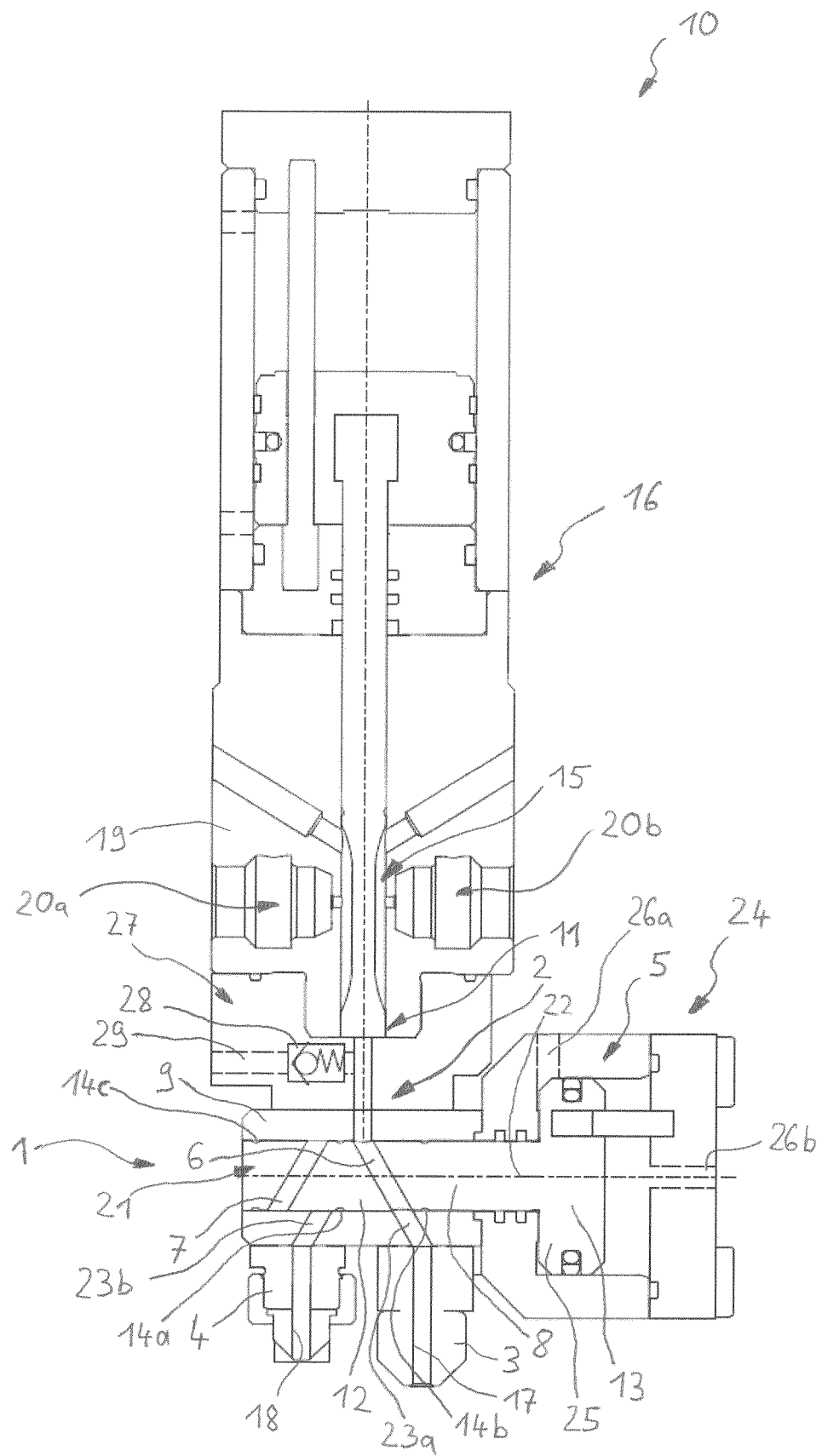

NOZZLE UNIT FOR A REACTION MOULDING MACHINE AND METHOD FOR PRODUCING A PLASTIC PART

CROSS-REFERENCE TO RELATED APPLICATIONS

This is a National Stage application of PCT international application PCT/EP2018/055027 filed on Mar. 1, 2018, which claims the priority of German Patent Application No. 10 2017 106 038.3, filed Mar. 21, 2017, which are incorporated herein by reference in their entireties.

FIELD OF THE INVENTION

The invention relates to a nozzle unit (also designated as nozzle device or nozzle module) for a reaction moulding machine (mixing and yielding several reactive plastic components), with an inlet channel prepared for connection to a mixing head outlet and with a first dispensing nozzle which is prepared for applying a reactive mixture and which is connected to the inlet channel in a first operating state. The invention further relates to a mixing head device, having the nozzle unit, for a reaction moulding machine, the reaction moulding machine with the mixing head device per se and a method for producing a plastic part, using the reaction moulding machine.

BACKGROUND OF THE INVENTION

Generic devices and method are already known from the prior art. DE 10 2004 059 218 A1 discloses a device for the production of one- and multi-layered foils or compound shaped parts, which contain at least one layer of reactive plastic, comprising storage containers for the reactive components, metering arrangements for the reactive components and a mixing head and a spray nozzle.

However, in the nozzle units known from the prior art, it has proved to be a disadvantage that, in order to implement different spray jets, either the nozzle unit is to be exchanged or the nozzle unit is to be activated in a relatively complicated manner. In the case of two mixing heads used in a parallel manner, which respectively have their own dispensing nozzle, additional switching units are required, however, for conveying the reactive mixture and its plastic components to the individual mixing heads.

BRIEF SUMMARY OF THE INVENTION

It is therefore an object of the present invention to eliminate the disadvantages known from the prior art and in particular to achieve the use of several different nozzles for producing a plastic part with as little activation complexity as possible.

This is solved according to the invention in that a second dispensing nozzle is present, which is connected to the inlet channel in a second operating state and which is likewise prepared for applying a reactive mixture. Therefore, the two dispensing nozzles (first dispensing nozzle and second dispensing nozzle) are able to be connected separately optionally to the inlet channel. Therefore, either only the first dispensing nozzle (first operating state) or only the second dispensing nozzle (second operating state) is connected to the inlet channel.

Thereby, a nozzle unit in the form of a nozzle change module is implemented, wherein its dispensing nozzles are connected to one and the same mixing head during operation. Therefore, in particular the necessary switching for diverting the individual plastic components of the reactive mixture is distinctly simplified.

Further advantageous embodiments are claimed in the subclaims and are explained further below.

Accordingly, it is advantageous if the first dispensing nozzle, preferably in a nozzle opening cross-section, differs from the second dispensing nozzle. In this context, it is particularly preferred if the two dispensing nozzles differ from one another in a size/dimension and/or a shape of the nozzle opening cross-section. Thereby, the dispensing nozzles are able to be adapted to the individual areas of use in a particularly individual manner.

Furthermore, it is advantageous here if the first dispensing nozzle is configured as a round jet nozzle (preferably with a round, particularly preferably circular, or square nozzle opening cross-section), and/or the second dispensing nozzle is configured as a flat jet nozzle (preferably with elliptical or rectangular nozzle opening cross-section).

In this context, it is pointed out in particular that the respective dispensing nozzle is configured always for the dispensing of the reactive mixture/reaction mixture which consists at least of two plastic components, in liquid form. The reactive mixture is preferably a polyurethane material, namely a still flowable/liquid polyurethane foam/hard foam. Consequently, the dispensing nozzles are prepared for dispensing a polyurethane reactive mixture.

In order to skillfully control the switching between the two dispensing nozzles, it is expedient if a valve arrangement is present (in the nozzle unit), which is configured to switch between the first operating state and the second operating state. Therefore, the respective dispensing nozzle can be activated individually in a skillful manner by means of an OR-circuit.

Furthermore, it is advantageous if the valve arrangement is actuated/activated hydraulically. However, it is also basically possible to activate the valve arrangement pneumatically or electrically. A combination of a hydraulic, pneumatic and an electric actuation is also further preferred.

With regard to the valve arrangement, it is in addition advantageous if the latter has a piston having two connecting channels (separate from one another), wherein the piston is configured so that in a first valve position it connects the inlet channel via its first connecting channel (with implementation of the first operating state) with the first dispensing nozzle, and in a second valve position it connects the inlet channel via its second connecting channel (with implementation of the second operating state) with the second dispensing nozzle. Thereby, a particularly compact valve arrangement is implemented.

It is further preferred if each connecting channel is configured as a (single) bore. Thereby, the effort of production of the piston is further reduced.

The piston is preferably configured as a sliding piston or as a rotary piston.

When the piston is configured as a sliding piston (i.e. displaceable in an axial direction), it is advantageous if it is guided displaceably with a first longitudinal region, having the connecting channels, in a housing of the nozzle unit. The sliding piston is displaceable to and fro particularly precisely in its longitudinal direction between the individual valve positions.

In this context, it is furthermore expedient if the sliding piston has, in a second longitudinal region, a widened head, against which an adjustment force is applied/is able to be applied, enforcing the valve positions during operation.

It is also advantageous if the piston has (preferably axially) between the two connecting channels a first recess receiving a sealing material or configured to receive the sealing material, which recess is preferably configured as an annular groove. Thereby, the sealing of the two connecting channels relative to one another is ensured.

In this context, it is advantageous in addition if the piston has, towards a (preferably axial) side of the first connecting channel facing away from the second connecting channel, a second recess receiving a sealing material or configured to receive the sealing material, which recess is again preferably configured as an annular groove, and/or towards a (preferably axial) side of the second connecting channel facing away from the first connecting channel, has a third recess receiving a sealing material or configured to receive the sealing material, which recess again is preferably embodied as an annular groove. Thereby, the sealing of the connecting channels towards the environment is also ensured.

The sealing material is already premounted as a seal, preferably as a sealing ring, during the mounting of the nozzle unit. Alternatively or additionally hereto, a portion of the reactive mixture, penetrating into the respective recess during operation of the nozzle unit, (also) forms the sealing material. In these cases, the connecting channels are always reliably sealed towards the environment and relative to one another.

The invention also relates to a mixing head device for a reaction moulding machine, with a mixing head having a mixing chamber and a mixing head outlet connected or connectable with this mixing chamber, and the nozzle unit according to the invention, arranged on the mixing head so as to be removable again, according to at least one of the previously described embodiments, wherein the inlet channel is connected to the mixing head outlet.

In addition, the invention relates to a reaction moulding machine with this mixing head device.

Furthermore, the invention relates to a method for producing a plastic part, wherein a reactive mixture is applied with the use of the mixing head device or the reaction moulding machine according to the previously described embodiments onto a mould (casting mould) providing a geometry of the plastic part, or onto a blank already partially forming the plastic part, which is configured for example as a dimensionally stable blank or as a film. Thereby, the plastic part can be produced particularly efficiently as a finished plastic component or as a semi-finished product.

In other words, therefore only one nozzle change component (one nozzle unit) is used in a mixing head. This module switches between flat jet nozzle and round jet nozzle. The switching units known from the prior art hitherto are therefore no longer required. Therefore, according to the invention, a method and a device are implemented for the production of plastic parts, using a mixing head together with a nozzle change module.

BRIEF DESCRIPTION OF THE DRAWINGS

The invention is now explained further below with the aid of a FIGURE, in which connection a preferred example embodiment is explained.

The single FIG. 1 shows a sectional illustration of a nozzle unit according to the invention, arranged on a mixing head of a reaction moulding machine, wherein the section runs in such a way that in particular an inlet channel, the outlet channels formed through two dispensing nozzles, and the connecting channels of the nozzle unit, connecting the outlet channels with the inlet channel in a respective valve position of a valve arrangement, can be seen.

The FIGURE is merely diagrammatic in nature and serves exclusively for an understanding of the invention. Identical elements are provided with the same reference numbers.

DESCRIPTION OF EXAMPLE EMBODIMENTS

FIG. 1 shows a unit, designated below as mixing head device 10, of a mixing head 16 and of a nozzle unit 1. The mixing head device 10 is used in its operation in a reaction moulding machine, not illustrated further here for the sake of clarity. The reaction moulding machine is configured in a typical manner for producing and dispensing/applying a reactive mixture/reaction mixture. The reactive mixture is a plastic reactive mixture, which is composed of various (at least two) reactive plastic components. The at least two plastic components, which are preferably processed and conveyed through the reaction moulding machine for the formation of the reactive mixture, are plastic components suitable for the production of a polyurethane mixture (polyurethane foam/polyurethane hard foam). A first plastic component is preferably a dialcohol/diol or respectively a polyol, and a second plastic component is preferably a polyisocyanate. The reaction moulding machine or respectively the mixing head device 10 is used for producing a finished plastic part/plastic component or for coating a blank provided for the formation of a plastic part, such as a foil (semi-finished product).

The two plastic components are mixed to the reactive mixture in operation in a typical manner in the mixing head 16. The two plastic components are mixed in a mixing chamber 15 of the mixing head 16. The mixing chamber 15 is formed within the mixing head 16, i.e. within a mixing head housing 19. Two lateral channels 20a and 20b, which respectively direct one of the plastic components during operation, open laterally into the central mixing chamber 15. Therefore, the plastic components are delivered during operation of the mixing chamber 15 via the lateral channels 20a and 20b. Adjoining the mixing chamber 15 is a mixing head outlet 11, emerging from the mixing head housing 19. During operation, subsequent to the mixing chamber 15, the present reactive mixture is conveyed towards the mixing head outlet 11. The mixing head outlet 11 is configured as an outlet bore.

The modular nozzle unit 1 is arranged on the mixing head housing 19 so as to be removable again by means of a screw connection, not illustrated further here for the sake of clarity. The nozzle unit 1 is connected to the mixing head outlet 11. In particular, the nozzle unit 1 has an inlet channel 2, which is connected with the mixing head outlet 11/is joined thereto.

The inlet channel 2 of the nozzle unit 1 is likewise introduced in a housing 9 of the nozzle unit 1 and implemented as a bore. The inlet channel 2 penetrates the housing 9 from an outer side towards an inner side of the housing 9. Therefore, the inlet channel 2 connects the mixing head outlet 11 during operation with an inner side of the housing 9. A piston receiving space 21 is formed on the inner side of the housing 9. A piston in the form of a sliding piston 8 of a valve arrangement 5 is received movably/displaceably in the piston receiving space 21. The piston receiving space 21 is therefore surrounded by the housing 9 and is shaped substantially cylindrically. The sliding piston 8 has a first longitudinal region 12, which has over its length a substantially uniform external diameter and is therefore configured substantially cylindrically. The sliding piston 8 (with the first longitudinal region 12) is guided displaceably via a sliding guide in the piston receiving space 21. The dimensions of the sliding piston 8 and of the piston receiving space 21 are coordinated with one another so that between the sliding piston 8 and the piston receiving space as narrow a gap as possible is present, in order to implement as precise a guiding of the sliding piston 8 as possible.

Two connecting channels 6, 7 run transversely to a longitudinal axis 22 of the sliding piston 8 and penetrate the sliding piston 8 transversely to the longitudinal axis 22. The two connecting channels 6 and 7 are arranged spaced apart from one another in axial direction of the longitudinal axis 22/the sliding piston 8. The two connecting channels 6, 7 are lined up in particular relative to a reference plane, to which the longitudinal axis 22 is configured as the normal, with an identical angular extent, directed towards one another. The connecting channels 6 and 7 are configured substantially identically. Both connecting channels 6 and 7 are implemented respectively as a bore/through-bore penetrating the sliding piston 8 in transverse direction.

Furthermore, two (connecting) passages 23a and 23b, connected to respectively a dispensing nozzle 3, 4, are contained in the housing 9 in a manner coordinated to the connecting channels 6 and 7. The passages 23a and 23b are also formed separately from one another and are spaced apart from one another in axial direction of the longitudinal axis 22. Each passage 23a and 23b penetrates, as also already the inlet channel 2, the housing 9 in a radial direction with respect to the longitudinal axis 22. The respective passage 23a and 23b is connected with one of the connecting channels 6, 7 and via this connecting channel 6, 7 with the inlet channel 2 as a function of a displacement position of the sliding piston 8. On the outer side of the housing 9 in the region of the emerging passages 23a and 23b respectively a dispensing nozzle 3, 4 is arranged. A first dispensing nozzle 3 is arranged (with a first outlet channel 17 formed through it) so that it (/the first outlet channel 17) is connected to the first passage 23a. A second dispensing nozzle 4 is arranged adjacent to the first dispensing nozzle 3 (with a second outlet channel 18 formed through it) so that it (/the second outlet channel 18) is connected to the second passage 23b.

The sliding piston 8 with its connecting channels 6, 7 is coordinated to the inlet channel 2 and to the passages 23a and 23b in such a way that in a first valve position (as illustrated in FIG. 1) in a first operating state with its first connecting channel 6 it connects the inlet channel 2 with the first passage 23a and therefore likewise with the first dispensing nozzle 3, and in a second valve position (axially offset relative to the first valve position) in a second operating state it connects the inlet channel 2 via its second connecting channel 7 with the second passage 23b and therefore likewise with the second dispensing nozzle 4.

Therefore, according to the invention, through the nozzle unit 1 a change unit is implemented, which optionally connects a first dispensing nozzle 3 (in the first valve position) or a second dispensing nozzle 4 (in the second valve position) with the inlet channel 2. The valve arrangement 5, acting/configured as a shuttle valve, is provided for switching over the nozzle unit 1. The nozzle unit 1 is therefore implemented as a nozzle change module.

The first dispensing nozzle 3 is configured with a different nozzle opening cross-section from the second dispensing nozzle 4. In particular, the first dispensing nozzle 3 is configured as a round jet nozzle, and the second dispensing nozzle 4 is configured as a flat jet nozzle. Therefore, the two dispensing nozzles differ in their shape of the nozzle opening cross-section.

Furthermore, it can be seen from FIG. 1 that the valve arrangement 5 is basically actuated hydraulically. For this, an actuating arrangement 24 is connected/formed in a second longitudinal region 13 of the sliding piston 8, formed in an offset manner to the first longitudinal region 12. In the second longitudinal region 13, arranged outside the piston receiving space 21, the sliding piston 8 has a head 25 which is widened compared to the first longitudinal region 12. Two hydraulic connections 26a and 26b cooperate with the head 25, via which connections respectively an adjustment force, acting on the head 25 in axial direction, can be generated. Therefore, depending on the pressure difference of the two hydraulic connections 26a and 26b, either a side of the head 25 facing the longitudinal region 12 or facing away from the longitudinal region 12 is acted upon with an excess pressure, so that the sliding piston 8 is forced into the respective valve position.

Furthermore, it can be seen in FIG. 1 that between the two connecting channels 6 and 7 and to their axial sides facing away from one another respectively a recess 14a to 14c is arranged, which serve for sealing the connecting channels 6 and 7 with respect to one another and towards the environment. The respective recesses 14a to 14c are configured identically as annular grooves. In operation, a sealing material is introduced in each recess 14a to 14c. The sealing material can basically be already introduced for the pre-mounting of the nozzle unit 1 in the sliding piston 8. Additionally or alternatively, each recess 14a to 14c can also be filled by the reactive mixture after the first putting into operation of the nozzle unit 1. The reactive mixture then entering in the recess 14a, 14b, 14c then hardens and swells in such a way that it likewise serves directly as sealing material. The connecting channels 6 and 7 are therefore sealed in an effective manner. A first recess 14a is arranged axially between the connecting channels 6 and 7 and seals the connecting channels 6 and 7 from one another. A second recess 14b is arranged towards an axial side of the first connecting channel 6 facing away from the second connecting channel 7. A third recess 14c is arranged towards an axial side of the second connecting channel 7 facing away from the first connecting channel 6. The sealing materials introduced in the two second and third recesses 14b, 14c therefore seal the connecting channels 6 and 7 towards the environment.

Furthermore, in FIG. 1 a diagrammatically illustrated cleaning arrangement 27 can be seen. The cleaning arrangement 27 is a component part of the nozzle unit 1. The cleaning arrangement 27 has a transverse bore 29 and a non-return valve 28 inserted into this transverse bore 29. The transverse bore 29 runs transversely to the inlet channel 2 and opens into the latter. After previous conveying of the reactive mixture through the respective outlet nozzle 3, 4 and therefore after completed production of a plastic part or respectively after completed coating of a blank provided for the formation of a plastic part by means of the reaction mixture, air or a cleaning fluid is introduced into this transverse bore 29 in a typical manner, so that the channels 2, 6 or 2, 7 and the passage 23a or 23b together with the dispensing nozzle 3 or 4 are cleaning/flushed free.

In other words, therefore according to the invention a mixing head 16 is available, in which an automatic nozzle change takes place between a round jet nozzle and a flat jet nozzle 3, 4. Therefore, the use of complex switching units is avoided. In the nozzle change module 1 according to the invention, a hydraulically driven changeover piston (sliding piston 8) is used for switching between round jet nozzle and flat jet nozzle 3, 4. The changeover piston 8 has two bores (connecting channels 6, 7); one bore (first connecting channel 6) for the round jet nozzle 3 and one bore (second connecting channel 7) for the flat jet nozzle 4. In order to seal the changeover piston 8 towards the exterior, the play between changeover piston 8 in the housing 9 is relatively small. In addition, the changeover piston 8 has three small grooves (recesses 14a, 14b, 14c) which are filled with sealing material.

LIST OF REFERENCE NUMBERS

1 nozzle unit
2 inlet channel
3 first dispensing nozzle
4 second dispensing nozzle
5 valve arrangement
6 first connecting channel
7 second connecting channel
8 sliding piston
9 housing
10 mixing head device
11 mixing head outlet
12 first longitudinal region
13 second longitudinal region
14a first recess
14b second recess
14c third recess
15 mixing chamber
16 mixing head
17 first outlet channel
18 second outlet channel
19 mixing head housing
20a first lateral channel
20b second lateral channel
21 piston receiving space
22 longitudinal axis
23a first passage
23b second passage
24 actuating arrangement
25 head
26a first hydraulic connection
26b second hydraulic connection
27 cleaning arrangement
28 non-return valve
29 transverse bore

What is claimed is:

1. A nozzle unit for a reaction moulding machine, the nozzle unit comprising, a mixing head outlet; a first dispensing nozzle; a second dispensing nozzle located adjacent to and independent of the first dispensing nozzle; an inlet channel connected to a-the mixing head outlet, the mixing head outlet configured to apply a reactive mixture via a selected one of the first and second dispensing nozzles, and a valve arrangement comprising a piston, the valve arrangement configured to switch between a first operating state and a second operating state, wherein in the first operating state, the first dispensing nozzle is connected to the inlet channel to apply the reactive mixture while the second dispensing nozzle is disconnected, wherein in the second operating state, the second dispensing nozzle is connected to the inlet channel to apply the reactive mixture while the first dispensing nozzle is disconnected, wherein the piston is configured as a sliding piston that is guided displaceably in a housing of the nozzle unit, the piston having a first through-bore and a second through-bore that are arranged spaced apart and separate from one another along an axial direction of a longitudinal axis of the piston, the piston being configured to switch from a first valve position to a second valve position, wherein when the valve arrangement is in the first operating state, the piston is in the first valve position so that the piston connects the inlet channel to the first dispensing nozzle via the first through-bore and disconnects the second nozzle, and wherein when the valve arrangement is in the second operating state, the piston is in the second valve position so that the piston connects the inlet channel to the second dispensing nozzle via the second through-bore and disconnects the first nozzle, wherein the piston translates horizontally with respect to a vertical longitudinal axis of the mixing head outlet.

2. The nozzle unit according to claim 1, wherein the first dispensing nozzle differs from the second dispensing nozzle in a nozzle opening cross-section.

3. The nozzle unit according to claim 1, wherein the first dispensing nozzle is configured as a round jet nozzle and/or the second dispensing nozzle is configured as a flat jet nozzle.

4. The nozzle unit (1) according to claim 1, wherein the piston (8) has, between the two connecting channels (6, 7), a first recess (14a) receiving a sealing material or configured to receive the sealing material.

5. The nozzle unit (1) according to claim 1, wherein the piston (8) has, towards a side of the first connecting channel (6) facing away from the second connecting channel (7), a second recess (14b) receiving a sealing material or configured to receive the sealing material and/or has, towards a side of the second connecting channel (7) facing away from the first connecting channel (6,) a third recess (14c) receiving a sealing material or configured to receive the sealing material,
   wherein when the valve arrangement is in the first operating state, the piston is in the first valve position so that the piston connects the inlet channel to the first dispensing nozzle via the first through-bore and disconnects the second nozzle, and
   wherein when the valve arrangement is in the second operating state, the piston is in the second valve position so that the piston connects the inlet channel to the second dispensing nozzle via the second through-bore and disconnects the first nozzle.

6. A mixing head device (10) for a reaction moulding machine comprising the nozzle unit (1) of claim 1, with a mixing head (16) having a mixing chamber (15) and a mixing head outlet (11) connected or connectable with this mixing chamber (15), and the nozzle unit (1) arranged on the mixing head (16) so as to be removable again, wherein the inlet channel (2) is connected to the mixing head outlet (11).

7. A reaction moulding machine with a mixing head device (10) according to claim 6.

8. A method for producing a plastic part, wherein a reactive mixture, with the use of the reaction moulding machine according to claim 7, is applied onto a negative mould providing a geometry of the plastic part, or onto a blank already partially forming the plastic part.

9. The nozzle unit according to claim 1, wherein the housing contains first and second connecting passages connected to the first dispensing nozzle and second dispensing nozzle, respectively.

10. The nozzle unit according to claim 9, wherein the first through-bores is positioned at a first angle and the second through-bore is positioned at a second angle,
   wherein the first connecting passage is positioned at the first angle and the second connecting passage is positioned at the second angle, wherein the first angle is equal in magnitude and opposite in direction to the second angle.

11. The nozzle unit according to claim 10, wherein the first and second angles are each acute angles with respect to the inlet channel.

\* \* \* \* \*